(12) United States Patent
Asher et al.

(10) Patent No.: US 7,287,002 B1
(45) Date of Patent: Oct. 23, 2007

(54) SYSTEM FOR PLACING PRODUCT DELIVERY ORDERS THROUGH THE INTERNET

(75) Inventors: Marc Asher, Highland Park, IL (US); David Brown, Orange, TX (US)

(73) Assignee: National Systems Corporation, Chicago, IL (US)

( * ) Notice: Subject to any disclaimer, the term of this patent is extended or adjusted under 35 U.S.C. 154(b) by 0 days.

(21) Appl. No.: 09/507,578

(22) Filed: Feb. 18, 2000

(51) Int. Cl.
   *G06Q 30/00* (2006.01)
(52) U.S. Cl. .......................................... 705/26; 705/27
(58) Field of Classification Search ............ 705/26–27, 705/37; G06F 17/60
   See application file for complete search history.

(56) References Cited

U.S. PATENT DOCUMENTS

| | | | |
|---|---|---|---|
| 5,353,219 A * | 10/1994 | Mueller et al. ............... | 705/26 |
| 5,506,897 A | 4/1996 | Moore | |
| 5,583,926 A | 12/1996 | Venier et al. | |
| 5,948,040 A * | 9/1999 | DeLorme et al. ........... | 701/201 |
| 5,991,739 A * | 11/1999 | Cupps et al. ................. | 705/26 |
| 6,026,375 A * | 2/2000 | Hall et al. ..................... | 705/26 |
| 6,032,084 A * | 2/2000 | Anderson et al. | |
| 6,310,889 B1 | 10/2001 | Parsons | |
| 6,327,349 B1 | 12/2001 | Rollins | |
| 6,374,302 B1 | 4/2002 | Galasso | |
| 2004/0254802 A1* | 12/2004 | Miller et al. ................... | 705/1 |

FOREIGN PATENT DOCUMENTS

| | | | |
|---|---|---|---|
| AU | 2002347308 A1 * | 6/2003 | |
| EP | 1451740 A2 * | 9/2004 | |
| GB | 2382421 A * | 5/2003 | |
| WO | WO0161605 * | 8/2001 | |
| WO | WO 2003046782 A2 * | 6/2003 | |

OTHER PUBLICATIONS

Ann Arnott, Help on wheels, Woman's Day, vol. 59, No. 1, Nov. 21, 1995.*
William Kress Boding, PGPUB-Document-No. 20030061110 A1, Mar. 27, 2003, Location based services virtual bookmarking.*
Frederick D. Busche et al., PBPUB-Document-No. 20030055707 A1, Mar. 20, 2003, Integrating spatial analysis to ascertain favorable positionin of retail products.*

(Continued)

*Primary Examiner*—Cuong Nguyen
(74) *Attorney, Agent, or Firm*—Schiff Hardin LLP

(57) ABSTRACT

A method is disclosed by which a customer places an order for the provision of a service with one of one or more vendors that utilize electronic ordering terminals to process service orders, by transmitting information between the customer's computer and a server. The disclosed method comprising the steps of associating with each vendor a plurality of coordinate points defining the vertices of a polygonal geographic region within which region the vendor provides service, receiving information from a customer indicating the location to which service is to be provided; converting the received information into a coordinate point indicating the point to which service is to be provided; selecting each of the defined polygonal geographic regions that encompass the customer coordinate point; identifying the vendors associated with the selected polygonal geographic regions; choosing the vendor with which the order is to be placed, and placing an order with the chosen vendor.

23 Claims, 13 Drawing Sheets

OTHER PUBLICATIONS

Robert S. Showghi et al., PBPUB-Document-No. 20030050854 A1, Mar. 13, 2003, Remote ordering system & method.*

C. Gbaguidi et al., A programmable architecture for the provision of hybrid services, IEEE Communications Magazine, vol. 37, issue 7, Jul. 1999, pp. 110-116.*

Lin Wei Dong et al., Hierarchical modeling of a Tabu Search Based Manufacturing Plant Ordering and Vehicle Dispatching Problem, Control and Automation, 2003, The 4th Inter. Conf. ICCA 2003, Jun. 10-12, 2003, pp. 995-999.*

A. D. Baker et al., Automatic factories, IEEE Potentials, vol. 12 issue 4, Dec. 1993, pp. 15-20.*

D. W. K. Hong et al., Distributed networking system for internet access service, Network Operations and Management Symposium, 2002, NOMS 2002, Apr. 15-19, 2002, pp. 813-825.*

ARCH-Based Traffic Forecasting and Dynamic Bandwidth Provisioning for Periodically Measured Nonstationary Traffic Krithikaivasan B.; Zeng Y.; Deka K.; Medhi D.; IEEE/ACM Transactions on Networking : Accepted for future publication vol. PP, Issue 99, 2007 p.1-1.*

US 5,768,357, 06/1998, Gruchala et al. (withdrawn)

* cited by examiner

Fig. 4

SAMPLE OF STORE STREETMAP DATABASE FOR QUIKORDER SYSTEM

| GROUP | STORE | STATE | CITY | STREET | START RANGE | END RANGE | ODD ZIP CODE | EVEN ZIP CODE |
|---|---|---|---|---|---|---|---|---|
| DOMINOS | 2755 | IL | CHICAGO | N ASHLAND AVE | 2500 | 2699 | 60614 | 60614 |
| DOMINOS | 2755 | IL | CHICAGO | N ASHLAND AVE | 2700 | 2799 | 60614 | 60614 |
| DOMINOS | 2755 | IL | CHICAGO | N ASHLAND AVE | 2800 | 3099 | 60657 | 60657 |
| DOMINOS | 2755 | IL | CHICAGO | N ASHLAND AVE | 3100 | 3199 | 60657 | 60657 |
| DOMINOS | 2755 | IL | CHICAGO | N ASHLAND AVE | 3201 | 3297 | 60657 | NOT SERVICED |
| DOMINOS | 2755 | IL | CHICAGO | N ASHLAND AVE | 3299 | 3399 | 60657 | 60657 |
| DOMINOS | 2755 | IL | CHICAGO | N ASHLAND AVE | 3400 | 3499 | 60657 | 60657 |
| DOMINOS | 2755 | IL | CHICAGO | N ASHLAND AVE | 3500 | 3599 | 60657 | 60657 |
| DOMINOS | 2755 | IL | CHICAGO | N BOSWORTH AVE | 2500 | 2699 | 60614 | 60614 |
| DOMINOS | 2755 | IL | CHICAGO | N BOSWORTH AVE | 2700 | 2799 | 60614 | 60614 |
| DOMINOS | 2755 | IL | CHICAGO | N BOSWORTH AVE | 3400 | 3499 | 60657 | 60657 |
| DOMINOS | 2755 | IL | CHICAGO | N BOSWORTH AVE | 3500 | 3599 | 60657 | 60657 |
| DOMINOS | 2755 | IL | CHICAGO | N BROADWAY ST | 2800 | 2899 | 60657 | 60657 |
| DOMINOS | 2755 | IL | CHICAGO | N BROADWAY ST | 2900 | 2999 | 60657 | 60657 |
| DOMINOS | 2755 | IL | CHICAGO | N BROADWAY ST | 3000 | 3136 | 60657 | 60657 |
| DOMINOS | 2755 | IL | CHICAGO | N BROADWAY ST | 3137 | 3199 | 60657 | 60657 |
| DOMINOS | 2755 | IL | CHICAGO | N BROADWAY ST | 3200 | 3399 | 60657 | 60657 |
| DOMINOS | 2755 | IL | CHICAGO | N BROADWAY ST | 3400 | 3499 | 60657 | 60657 |
| DOMINOS | 2755 | IL | CHICAGO | N BROADWAY ST | 3500 | 3545 | 60657 | 60657 |
| DOMINOS | 2755 | IL | CHICAGO | N BROADWAY ST | 3547 | 3599 | 60657 | NOT SERVICED |

Fig. 8a

```
ZIPD1("LATLON",1
02 Feb 2000    2:24 PM
^ZIPD1("LATLON",1,0)
DPI-7734^C^LOS
ANGELES^CA^06037^2970101^34.279017^
-118.692223^SIMI VALLEY^5235
COCHRAN^93063^10013
^ZIPD1("LATLON",1,1,0)
^5300.1^41^41
^ZIPD1("LATLON",1,1,1,0)
34.300129^-118.718191
^ZIPD1("LATLON",1,1,2,0)
34.297013^-118.716648
^ZIPD1("LATLON",1,1,3,0)
34.29358^-118.716455
^ZIPD1("LATLON",1,1,4,0)
34.290046^-118.716288
^ZIPD1("LATLON",1,1,5,0)
34.286315^-118.716073
^ZIPD1("LATLON",1,1,6,0)
34.281715^-118.716694
^ZIPD1("LATLON",1,1,7,0)
34.279311^-118.716991
^ZIPD1("LATLON",1,1,8,0)
34.278744^-118.716305
^ZIPD1("LATLON",1,1,9,0)
34.278405^-118.716274
^ZIPD1("LATLON",1,1,10,0)
34.27816^-118.716255
^ZIPD1("LATLON",1,1,11,0)
34.277778^-118.71622
^ZIPD1("LATLON",1,1,12,0)
34.277497^-118.716195
^ZIPD1("LATLON",1,1,13,0)
34.277064^-118.716162
^ZIPD1("LATLON",1,1,14,0)
34.27658^-118.716118
^ZIPD1("LATLON",1,1,15,0)
34.276101^-118.716082
^ZIPD1("LATLON",1,1,16,0)
34.27557^-118.716033
^ZIPD1("LATLON",1,1,17,0)
34.274968^-118.715988
^ZIPD1("LATLON",1,1,18,0)
34.274653^-118.715959
^ZIPD1("LATLON",1,1,19,0)
34.27417^-118.715924
^ZIPD1("LATLON",1,1,20,0)
34.273647^-118.715875
^ZIPD1("LATLON",1,1,21,0)
34.273216^-118.715844
^ZIPD1("LATLON",1,1,22,0)
34.272814^-118.715806

^ZIPD1("LATLON",1,1,23,0)
34.272295^-118.71577
^ZIPD1("LATLON",1,1,24,0)
34.27174^-118.715717
^ZIPD1("LATLON",1,1,25,0)
34.271065^-118.715672
^ZIPD1("LATLON",1,1,26,0)
34.270241^-118.715591
^ZIPD1("LATLON",1,1,27,0)
34.269608^-118.715555
^ZIPD1("LATLON",1,1,28,0)
34.267698^-118.715448
^ZIPD1("LATLON",1,1,29,0)
34.266572^-118.715247
^ZIPD1("LATLON",1,1,30,0)
34.261891^-118.714763
^ZIPD1("LATLON",1,1,31,0)
34.262033^-118.712877
^ZIPD1("LATLON",1,1,32,0)
34.26444^-118.709449
^ZIPD1("LATLON",1,1,33,0)
34.264299^-118.680653
^ZIPD1("LATLON",1,1,34,0)
34.257501^-118.676196
^ZIPD1("LATLON",1,1,35,0)
34.252403^-118.666426
^ZIPD1("LATLON",1,1,36,0)
34.256368^-118.653228
^ZIPD1("LATLON",1,1,37,0)
34.259767^-118.645515
^ZIPD1("LATLON",1,1,38,0)
34.293898^-118.647057
^ZIPD1("LATLON",1,1,39,0)
34.293756^-118.688195
^ZIPD1("LATLON",1,1,40,0)
34.30112^-118.688366
^ZIPD1("LATLON",1,1,41,0)
34.300129^-118.718191
^ZIPD1("LATLON",1,1,"B",34.252403,35)
^ZIPD1("LATLON",1,1,"B",34.256368,36)
^ZIPD1("LATLON",1,1,"B",34.257501,34)
^ZIPD1("LATLON",1,1,"B",34.259767,37)
^ZIPD1("LATLON",1,1,"B",34.261891,30)
^ZIPD1("LATLON",1,1,"B",34.262033,31)
^ZIPD1("LATLON",1,1,"B",34.264299,33)
^ZIPD1("LATLON",1,1,"B",34.26444,32)
^ZIPD1("LATLON",1,1,"B",34.266572,29)
^ZIPD1("LATLON",1,1,"B",34.267698,28)
^ZIPD1("LATLON",1,1,"B",34.269608,27)
^ZIPD1("LATLON",1,1,"B",34.270241,26)
^ZIPD1("LATLON",1,1,"B",34.271065,25)
^ZIPD1("LATLON",1,1,"B",34.27174,24)
```

Fig. 8b

```
^ZIPD1("LATLON",1,1,"B",34.272295,23)
^ZIPD1("LATLON",1,1,"B",34.272814,22)
^ZIPD1("LATLON",1,1,"B",34.273216,21)
^ZIPD1("LATLON",1,1,"B",34.273647,20)
^ZIPD1("LATLON",1,1,"B",34.27417,19)
^ZIPD1("LATLON",1,1,"B",34.274653,18)
^ZIPD1("LATLON",1,1,"B",34.274968,17)
^ZIPD1("LATLON",1,1,"B",34.27557,16)
^ZIPD1("LATLON",1,1,"B",34.276101,15)
^ZIPD1("LATLON",1,1,"B",34.27658,14)
^ZIPD1("LATLON",1,1,"B",34.277064,13)
^ZIPD1("LATLON",1,1,"B",34.277497,12)
^ZIPD1("LATLON",1,1,"B",34.277778,11)
^ZIPD1("LATLON",1,1,"B",34.27816,10)
^ZIPD1("LATLON",1,1,"B",34.278405,9)
^ZIPD1("LATLON",1,1,"B",34.278744,8)
^ZIPD1("LATLON",1,1,"B",34.279311,7)
^ZIPD1("LATLON",1,1,"B",34.281715,6)
^ZIPD1("LATLON",1,1,"B",34.286315,5)
^ZIPD1("LATLON",1,1,"B",34.290046,4)
^ZIPD1("LATLON",1,1,"B",34.29358,3)
^ZIPD1("LATLON",1,1,"B",34.293756,39)
^ZIPD1("LATLON",1,1,"B",34.293898,38)
^ZIPD1("LATLON",1,1,"B",34.297013,2)
^ZIPD1("LATLON",1,1,"B",34.300129,1)
^ZIPD1("LATLON",1,1,"B",34.300129,41)
^ZIPD1("LATLON",1,1,"B",34.30112,40)
^ZIPD1("LATLON",1,2,0)
^5300.01^7^7
^ZIPD1("LATLON",1,2,1,0)
.1938243313076073426^34.261891^-
118.714763^.002426487713^^-
.000820891276
^ZIPD1("LATLON",1,2,2,0)
.4890330542016524055^34.279311^-
118.716991^.003280859689^-
.000820891276^-.00102037257
^ZIPD1("LATLON",1,2,3,0)
.744823806750171613^34.300129^-
118.718191^.004957386301^-
.00102037257^-.001474727065
^ZIPD1("LATLON",1,2,4,0)
1.147646275051905431^34.30112^-
118.688366^.002854709689^-
.001474727065^-.001853999873
^ZIPD1("LATLON",1,2,5,0)
2.007515833918494058^34.293898^-
118.647057^.002096993186^-
.001853999873^-.000725068629
^ZIPD1("LATLON",1,2,6,0)
2.802995611131630107^34.259767^-
118.645515^.000491498417^-
.000725068629^-.000014277957
^ZIPD1("LATLON",1,2,7,0)
2.849746632372242063^34.256368^-
118.653228^.000189908429^-
.000014277957^
^ZIPD1("LATLON",1,2,"B",.1938243313
076073426,1)
^ZIPD1("LATLON",1,2,"B",.4890330542
016524055,2)
^ZIPD1("LATLON",1,2,"B",.7448238067
50171613,3)
^ZIPD1("LATLON",1,2,"B",1.147646275
051905431,4)
^ZIPD1("LATLON",1,2,"B",2.007515833
918494058,5)
^ZIPD1("LATLON",1,2,"B",2.802995611
131630107,6)
^ZIPD1("LATLON",1,2,"B",2.849746632
372242063,7)
^ZIPD1("LATLON",1,3)
34.252403^-118.666426^34.300129^-
118.718191^34.30112^-
118.688366^34.259767^-118.645515
```

Fig. 8c

```
NAME: DPI-7466-B                          TYPE: CORPORATE
  COUNTY: CLARK                           STATE: NV
  DIGITIZE_DATE: OCT 30, 1999             LATITUDE: 36.07112
  LONGITUDE: -115.086978                  CITY: LAS VEGAS
  ADDR: 3981 SUNSET ROAD #1               ZIP: 89120
  LIST: IBL_BUSINESS
LATITUDE: 36.0289                         LONGITUDE: -115.0458
LATITUDE: 36.02409                        LONGITUDE: -115.0834
LATITUDE: 36.023324                       LONGITUDE: -115.085891
LATITUDE: 36.02                           LONGITUDE: -115.0935
LATITUDE: 36.019989                       LONGITUDE: -115.099299
LATITUDE: 36.02798                        LONGITUDE: -115.099458
LATITUDE: 36.034446                       LONGITUDE: -115.099418
    .                                         .
    .                                         .
    .                                         .
LATITUDE: 36.058203                       LONGITUDE: -115.027028
LATITUDE: 36.056719                       LONGITUDE: -115.025601
LATITUDE: 36.04741                        LONGITUDE: -115.021256
LATITUDE: 36.032682                       LONGITUDE: -115.013444
LATITUDE: 36.0311                         LONGITUDE: -115.027399
LATITUDE: 36.0289                         LONGITUDE: -115.0458
CONVEXHULL: 1.23408446804223141           LATITUDE: 36.0717
   LONGITUDE: -115.1174                   DISTANCESQUARED: .003001673722
   CLOCKLINE: -.0002539324
CONVEXHULL: 1.301512376652202882          LATITUDE: 36.0863
   LONGITUDE: -115.1176                   DISTANCESQUARED: .004732075322
   COUNTERLINE: -.0002539324               CLOCKLINE: -.003011403231
CONVEXHULL: 1.964986844016424642          LATITUDE: 36.08562
   LONGITUDE: -115.071999                 DISTANCESQUARED: .005052718161
   COUNTERLINE: -.003011403231             CLOCKLINE: -.003281544138
CONVEXHULL: 2.573047829139471252          LATITUDE: 36.063498
   LONGITUDE: -115.031201                 DISTANCESQUARED: .006530370685
   COUNTERLINE: -.003281544138             CLOCKLINE: -.000705286742
CONVEXHULL: 2.679237636984684854          LATITUDE: 36.056719
   LONGITUDE: -115.025601                 DISTANCESQUARED: .006780488104
   COUNTERLINE: -.000705286742             CLOCKLINE: -.002218005436
CONVEXHULL: 2.994813598656770307          LATITUDE: 36.032682
   LONGITUDE: -115.013444                 DISTANCESQUARED: .007532193274
   COUNTERLINE: -.002218005436             CLOCKLINE: -.000072662302
CONVEXHULL: 3.139695777092670424          LATITUDE: 36.02
   LONGITUDE: -115.0935                   DISTANCESQUARED: .000033628522
   COUNTERLINE: -.000072662302
   BOTTOM LATITUDE: 36.019989             BOTTOM LONGITUDE: -115.099299
   LEFT LATITUDE: 36.0863                 LEFT LONGITUDE: -115.1176
   TOP LATITUDE: 36.0863                  TOP LONGITUDE: -115.1176
   RIGHT LATITUDE: 36.032682              RIGHT LONGITUDE: -115.013444
```

*(clockline is the angle from the southernmost vertex point in the convexhull, measured counterclockwise)

SYSTEM FOR PLACING PRODUCT DELIVERY ORDERS THROUGH THE INTERNET

BACKGROUND OF THE INVENTION

1. Field of the Invention

This invention relates in general to the delivery of product orders. In particular, the invention relates to a system by which a delivery or pick up order can be placed over the Internet to one of a plurality of potential vendors.

2. Background Art

In recent years, the Internet has rapidly become a prominent aspect of commerce throughout many areas of the world due to its efficiency and convenience. Furthermore, the Internet offers consumers access to a breadth of information and services greater than ever before. The concept of "electronic commerce" has now become a reality whereby a consumer can purchase goods via the Internet. Consumers can view both descriptions and pictures of items offered for sale via a web browser, place an order and make payment via a web site. While sitting at a computer, within mere minutes a person can comparison shop at numerous stores across the country, and even the world.

However, certain types of commerce for which the Internet can be effectively employed still depend upon the geographic proximity between a user wishing to purchase goods and/or services and a business offering goods and services. Specifically, some services, such as the delivery of prepared food items, are provided by a business only to customers located within a specific predefined geographic area relative to the business' location. Therefore, while a user in New York could easily access a Chicago pizzeria's web site via the Internet and order a pizza for delivery to New York, such an order would not typically be fulfilled. Accordingly, it is an object of this invention to identify business locations that have service areas covering the user's location.

Oftentimes, a user may wish to order a product or service from one of a chain of related businesses, such as a pizza delivery franchise, over the Internet. Franchisees are typically assigned rigidly defined market areas by the franchiser. Furthermore, a franchisee business may desire to include or exclude specific geographic regions from its assigned service area. Therefore, it is highly desirable, and an object of this invention, to allow vendors to customize and very accurately define specific geographic areas that they wish to service via orders placed over the Internet.

One prior art technique for correlating users with local service providers relies upon the user providing his postal zip code to a central computer server operated by or on behalf of the business. The central computer then determines which if any relevant businesses service the user's zip code. The list of relevant businesses identified by the server can either be returned to the user, or else the central office can automatically select one business to which the order is to be placed. However, this model is of limited utility insofar is it correlates users to local businesses by matching postal zip codes—which are arbitrarily predefined regions unrelated to typical delivery area boundaries that may be desired by a business. Accordingly, it is an object of this invention to provide for the arbitrary implementation of service area boundaries for orders placed via the Internet.

Another technique for correlating Internet consumers with local businesses is disclosed by Cupps, et al., U.S. Pat. No. 5,991,739. The Cupps et al. technique involves the generation of an arbitrary geographic grid through which the world is divided into an array of quadrilateral regions. Each region is assigned an identifier code which is a function a series of longitude and latitude coordinates. A business providing a service over a defined geographic area, such as a food delivery business, can therefore associate itself with identifier codes for each of the grid regions within its defined delivery region. When a customer desires to place an order, the customer's address is received by a central computer server, and therein associated with a specific geographic grid or region. Businesses that service the customer's location can then be rapidly identified by indexing the store delivery grid database with the customer geographic grid or area. The customer is then presented with a selection of businesses whose associated service areas include the grid in which the service is to be provided. The customer can choose a desired business, and electronically transmit an order to the central server. The central server then relays the order to the selected business via a telephone call by an interactive voice system.

Cupps et al. provides for faster correlation between customers and businesses, and increased flexibility in business service area definition, compared to the zip code matching prior art, insofar as the geographic areas associated with the service area can be smaller than postal zip codes. However, by defining the location of the customer and the business' service areas in terms of predetermined geographic areas, the Cupps et al. technique inherently introduces uncertainty and imprecision to the positional identification of both the consumer, and the borders of a business service area.

In areas of commerce with very tightly defined service boundaries, such as pizza delivery franchises, accurate and precise association of customers with store service areas is particularly important. Franchisees who provide service to areas outside of their assigned territory may violate or breach their franchise agreements and be subject to penalty or even termination of their franchise rights. Franchisers often look to police franchisee activities to protect adjacent franchisees. Because the Cupps et al. technique is based upon a predefined grid, it is susceptible to erroneous and imprecise correlation between stores and customers. One source of imprecision is that each store must define its service region in terms of the predetermined grid areas, rather than a geographic definition corresponding to the service area. A second source of error is that a customer is referenced by association with a geographic grid or area, rather than the customer's actual position. Furthermore, as grid size is reduced linearly, the complexity and inefficiency of the Cupps et al. algorithm increases geometrically due to the geometrically increasing number of quadrilateral grid areas that must be stored and searched within the service area database. Accordingly, it is an object of this invention to correlate Internet customers with business service areas to a degree of accuracy limited only by the precision of commercially available mapping software.

As use of the Internet becomes increasingly prevalent, many more businesses will have digital communication network access available in-store, via either a dedicated Internet connection or a telephone line modem or other communication device capable of receiving data or information transmissions. Furthermore, stores often use electronic Point Of Sale ("POS") order systems for the electronic entry and tracking of orders placed by customers who place orders by telephone. Accordingly, it is also an object of this invention to utilize communications networks to transfer a customer's order from a central server to a store's POS for automatic entry into a selected store's order system, whereby the order is processed automatically as if it were entered in-store.

The POS order systems used by many delivery businesses incorporate street address files to identify and log locations to which orders are delivered. In implementing an Internet order delivery system for such businesses, it may be beneficial, when possible, to match a customer's location with a particular entry in the store's street address file. By correlating the customer's location to the in-store delivery area file, an order placed electronically can be automatically processed by an existing POS system according to the pre-existing order protocol. Accordingly, it is an object of this invention to correlate customers with stores using a street address file defined for each store.

Many areas utilize vanity addresses, or other non-standard addresses, that may not appear in commercially available location indexing software packages. For example, a customer located on the 63rd floor of the Sears Tower, in Chicago, Ill., may enter a delivery address of 6300 Sears Tower, Chicago, Ill. Likewise, a student on a college campus may enter the room number and name of a dormitory, rather than the actual dormitory street address. Insofar as such vanity addresses are not actual street addresses, they typically may not appear in common address/geographic databases. Therefore, many prior art systems, such as the Cupps et al. system, may fail to automatically process such an order. Accordingly, it is an object of this invention to allow a business to extend its definition of acceptable service areas to include non-standard addresses.

One particular object of the present invention is to provide a registration engine to enroll users and at the time of enrollment associate one or more business locations who serve the user's geographic location such that when the user logs into the system at a later time the system will recognize the user and provide the previously identified business locations from which the user may order goods or services.

A further object of the present invention is to provide a marketing engine whereby a business' POS system can update the central server with store manager specials relating to price or items or services offered to thereby provide highly customized offerings to user's who have a particular association with a business location. For example, a pizza store located near a college campus may offer "homecoming" specials while a store across town that does not deliver to the campus location may not.

Yet another object of the present invention is the provision of a unique POS identification such that users who access a particular business's records stored on the central computer view a unique visual presentation which may differ from that offered to a user who seeks another business.

These and other objects of the present invention will become apparent to those of ordinary skill in the art in light of the present specifications, drawings and claims.

SUMMARY OF THE INVENTION

The invention provides a technique by which a customer can place an order over the Internet for provision of a service to a business with a geographic service area that includes the customer's desired delivery location. Through the use of a web browser, the customer logs into a central service web site, and provides his street address thereto. Alternatively, such information could be transmitted to the web site from a third party provider, such as a cable access provider, as in the case of interactive television.

The web site first indexes a master database of ZIP codes to generate a first list of stores that provide service to at least some part of each ZIP code.

The web site contains databases of service area street map information for each business with which it is associated. The street map information includes city, state, and street names, along with precisely defined ranges of addresses to which delivery is available on the named streets. The site searches to determine whether the delivery address is located within the street map file for each store of the first list of stores. For each street map file in which the delivery address is located, the associated store is added to a list of available stores.

When a delivery address cannot be located within a store's street map, the web site utilizes a geopointing technique as an alternative determination of whether the store services the delivery location. Each store is associated with a set of latitude and longitude coordinate points, which points define the vertices of a geographic polygon within which the store provides service. The delivery address is converted to a precise latitude and longitude coordinate point via software techniques known in the art of geographic location. The site then determines whether the delivery address coordinate point lies within the polygon associated with the store service area. If so, the store is added to the list of available stores.

Stored for each store in conjunction with the polygon vertices, are the coordinates of a rectangle that encompasses the entire polygon, and convex hull information derived from the polygon vertices. The process of determining whether the delivery address coordinate point lies within the service area polygon is then accomplished in three steps. Firstly, a store is considered not available if the delivery address coordinate point lies outside of the rectangle bounding the entire store service area. Secondly, the store is considered not available if the delivery address coordinate point lies outside of the convex hull of the polygon vertices. Finally, an exact determination of whether the delivery address coordinate point lies within the store polygon is performed. The store is considered not available if a ray extending from the coordinate point crosses segments of the polygon boundary an even number of times. Stores remaining after these three steps are considered to be available as geopointing matches.

Finally, if a store fails to match the delivery address by way of both the street map file lookup and geopoint matching, alternative matching techniques can be employed. The delivery address provided by the user can be progressively truncated until it matches one or more street names found in the store street map file, at which point the user has the option of selecting one of the partially matched street names as the delivery address, and the store with which the street map file is associated as an available store. The web site can also search a store's customer database for records with a telephone number field matching the delivery telephone number provided by the user. Matching records in the store customer database are then displayed to the user for possible selection thereof as delivery information for the user's present order. Accordingly, the store from which the matching customer database record was retrieved is deemed to be an available store.

If one or more stores are found to be available to service the delivery location, one of the available stores is assigned to the user for receipt of orders therefrom. The user is presented with an order entry page, with which an order can be entered into the web site. The web site then places the order electronically with the assigned store, and emails an order confirmation to the user.

BRIEF DESCRIPTION OF THE DRAWINGS

FIG. 4 is a table of data appearing in a typical store STREET service area file.

FIGS. 8a and 8b comprise a database file defining the service area of a store with geographic latitude and longitude points.

FIG. 8c is another illustration of a database file defining the service area of a store with geographic latitude and longitude points.

DETAILED DESCRIPTION OF THE DRAWINGS

Figure 1:
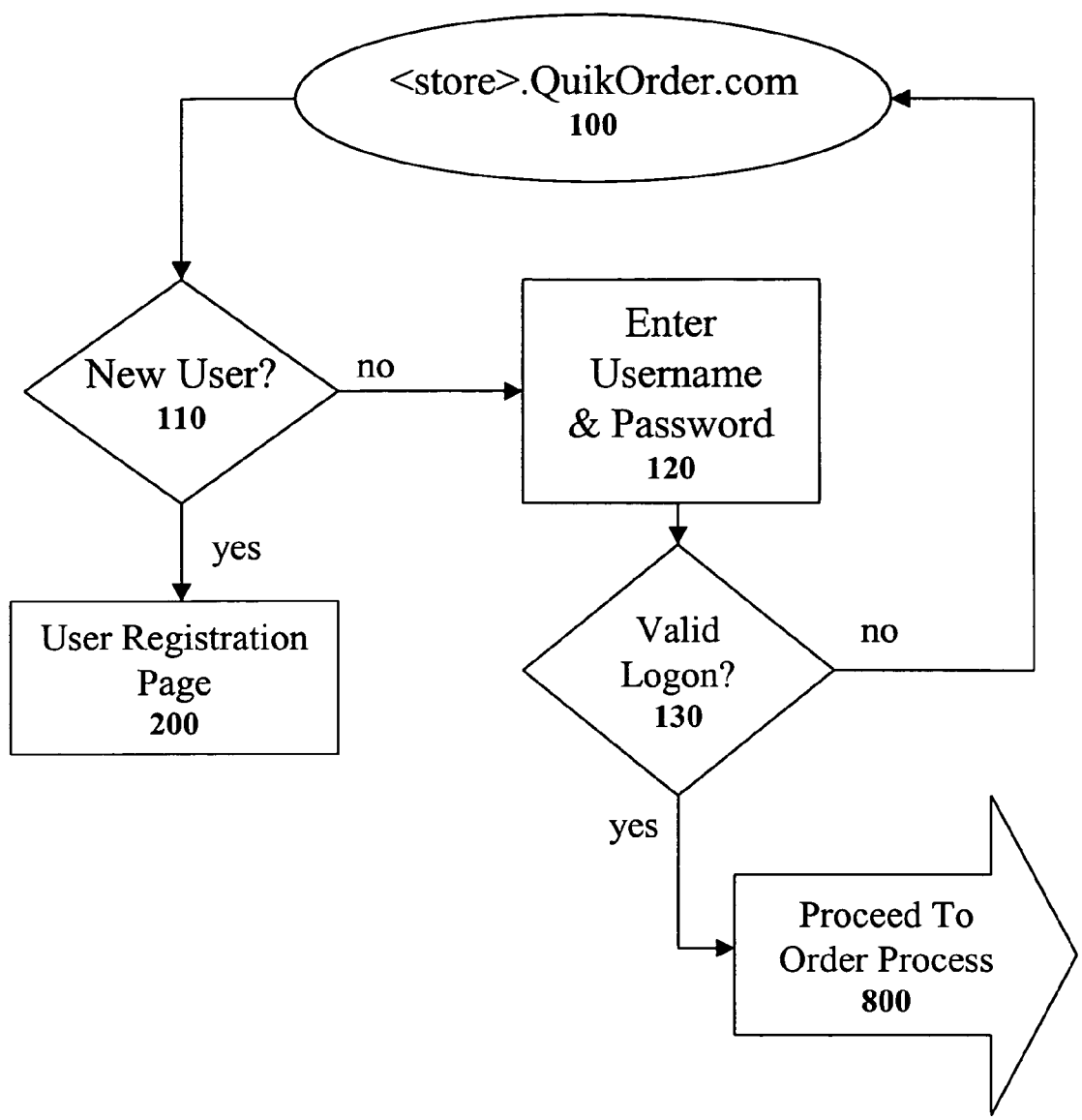
FIG. 1 is a flowchart of the process by which a user initiates communications with the Internet order server.

While this invention is susceptible to embodiment in many different forms, there are shown in the drawings and will be described in detail herein several specific embodiments. The present disclosure is to be considered as an exemplification of the principle of the invention intended merely to explain and illustrate the invention, and is not intended to limit the invention in any way to embodiments illustrated.

The embodiment illustrated is a system for placing orders for pizza delivery or carry out using a web browser via an Internet web site to a store that is a part of a chain of restaurants. For purposes of this disclosure the web site is referred to by the name Quikorder.com. While the present invention is disclosed in the context of businesses providing pizza and pizza delivery and carry out services the invention is deemed to have utility in other fields. The invention implements multiple techniques by which customers are associated with restaurants. However, it is envisioned that the techniques could be implemented individually, or in other combinations, as desired. Furthermore, the techniques taught herein can readily be adapted for use in conjunction with restaurants not part of a franchised chain, or with businesses providing services other than food delivery. The system disclosed can also be implemented using access mechanisms other than an Internet World Wide Web interface, such as other Internet protocols, modems, wireless modems, or interactive television data terminals.

The user first accesses the QuikOrder site by following a Universal Resource Locator ("URL") link to the logon/registration page of the QuikOrder web site, step 100, depicted in FIG. 1. Businesses can implement their own branded entry points to the system by utilizing branded third level domains (for example: http://dominos.quikorder.com for Domino's Pizza restaurants). In step 110, the user is presented with the option to either log on with an existing username and password (step 120) or to register themselves as a new user. If the user is a pre-existing user and enters a valid username and password, the user will be next directed to the order taking process 800. If the user is new to the system, the user will then proceed to the new user registration page (step 200).

Figure 2:
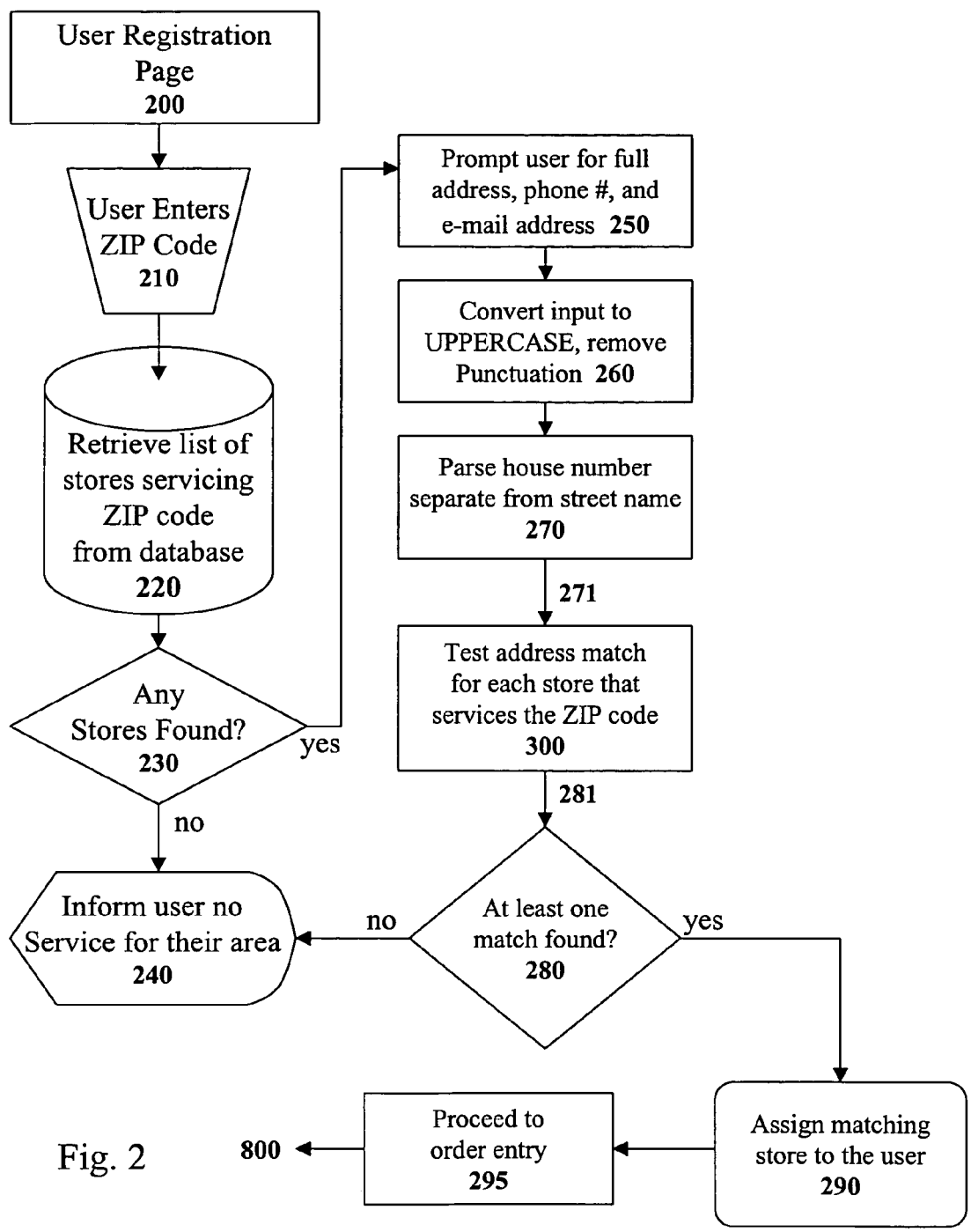
FIG. 2 is a flowchart illustrating the process by which a user registers with the Internet order server.

FIG. 2 illustrates operation of the registration engine which executes the new user registration process. The user enters the ZIP code of the address to which delivery is to be made in step 210. The system then retrieves a list of stores that service the delivery ZIP code from a store-ZIP association database (step 220). Step 220 serves several functions. It provides a quick rough check to see whether or not the user can be serviced at all, thereby allowing for a prompt response to users with no nearby participating restaurants—before the user is required to undergo a time consuming data entry process. Also, step 220 serves as a rough sort to narrow the list of restaurants that must be analyzed for precise correlation with the user delivery location.

It is understood that the user login procedure and the provision of information, as described in steps 100–210 of the illustrated embodiment, could be performed in an automated manner in other embodiments of this invention. For example, when a user accesses the system via an interactive television or wireless access device, the login and/or address information could be previously associated with the user and transmitted automatically by a third party service provider upon the user's access to the food delivery system disclosed herein.

In step 230, the system determines whether any restaurants at all were found that service the user's delivery ZIP code. If there are no stores found that service the entered ZIP code, the user is presented with a message informing them that the system is unable to service them (step 240). If one or more stores are found to service the user's ZIP code, the user is prompted to provide full account information, including complete delivery address, telephone number, and e-mail address (step 250).

After the user provides the requested account information, the system first performs a basic standardization by converting the input to all uppercase characters and removing any extraneous punctuation, such as periods placed at the end of abbreviations (step 260). Because the user is prompted to enter their street address in a natural manner, by including the house number with the street address, in step 270 the system parses out the numeric part of the user input to separate the house number from the street name. In step 300, the system then processes that address in a series of successive steps to determine if any of the stores that had previously been identified as servicing some portion of the user's ZIP code are able to service the user's exact address.

Figure 3:
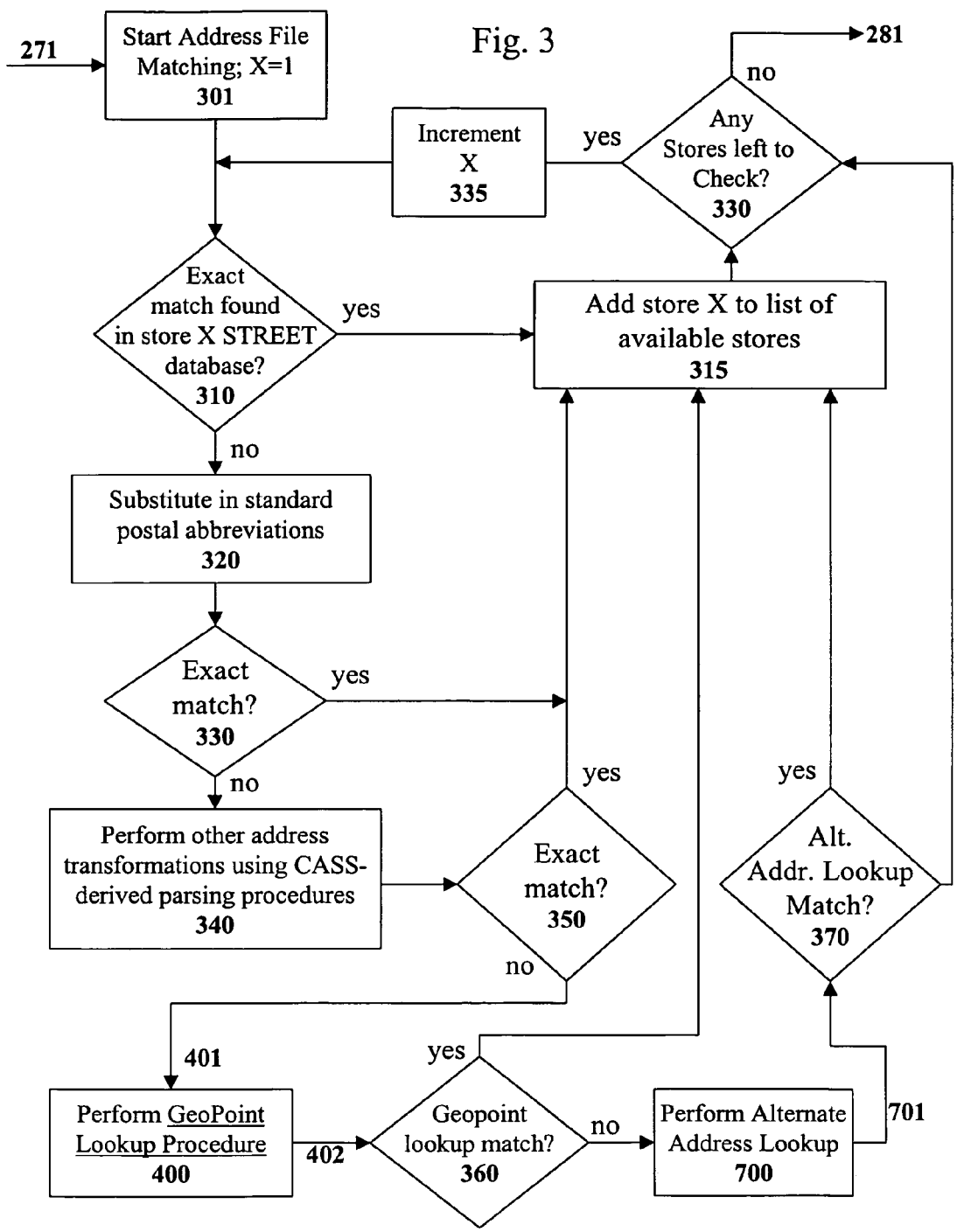
FIG. 3 is a flowchart of a store assignment process.

FIG. 3 illustrates step 300, the process by which the delivery address is tested against store data to determine which stores, if any, service the exact delivery address. For the first store identified as servicing the user's ZIP code, the system first references a predefined STREET file database associated with that store. The STREET file database is based upon information set up manually by the store owner, and is comprised of state, city, and street name combinations that are serviced by each store. For each street name, there is also a series of entries listing the address ranges serviced on that street. Sample data from a store STREET file is shown in FIG. 4.

If an exact match of the delivery state, city, and street name is made with an entry in the store's STREET file database, and the house number is within a range appearing therein, the store is included in a list of stores that service the requested user delivery location (step 315). After a matching store is added to the list, the system determines if any additional stores were identified as including the user delivery ZIP code within its service area, step 330. If all potentially matching stores have already been evaluated for an exact match with the delivery address, the system proceeds via step 290 to assigning one or more business locations to the user and via step 295 toward order entry process 800. If no additional stores serving within the delivery ZIP remain to be checked, the matching process is incremented to identify the next potentially matching store, step 335, and the matching process is repeated back to step 310.

If an exact match of the user's address with an entry in the store's STREET file is not found, the system then iteratively tries to substitute in all valid postal abbreviations in the user's address, step 320, and checks to see if there is an exact match, step 330. Again, if there is an exact match, the system includes the identified store to a list of stores that can service the user (step 315). If not, the system proceeds to use various other address transforming techniques derived from postal Coding Accuracy Support System ("CASS") techniques, to try to match the user's delivery address to addresses contained within the STREET file, step 340. If an exact match is found between the processed delivery address and an address within the store's STREET file, the store is added to the list of stores that service the user's address, step 315.

Figure 5:
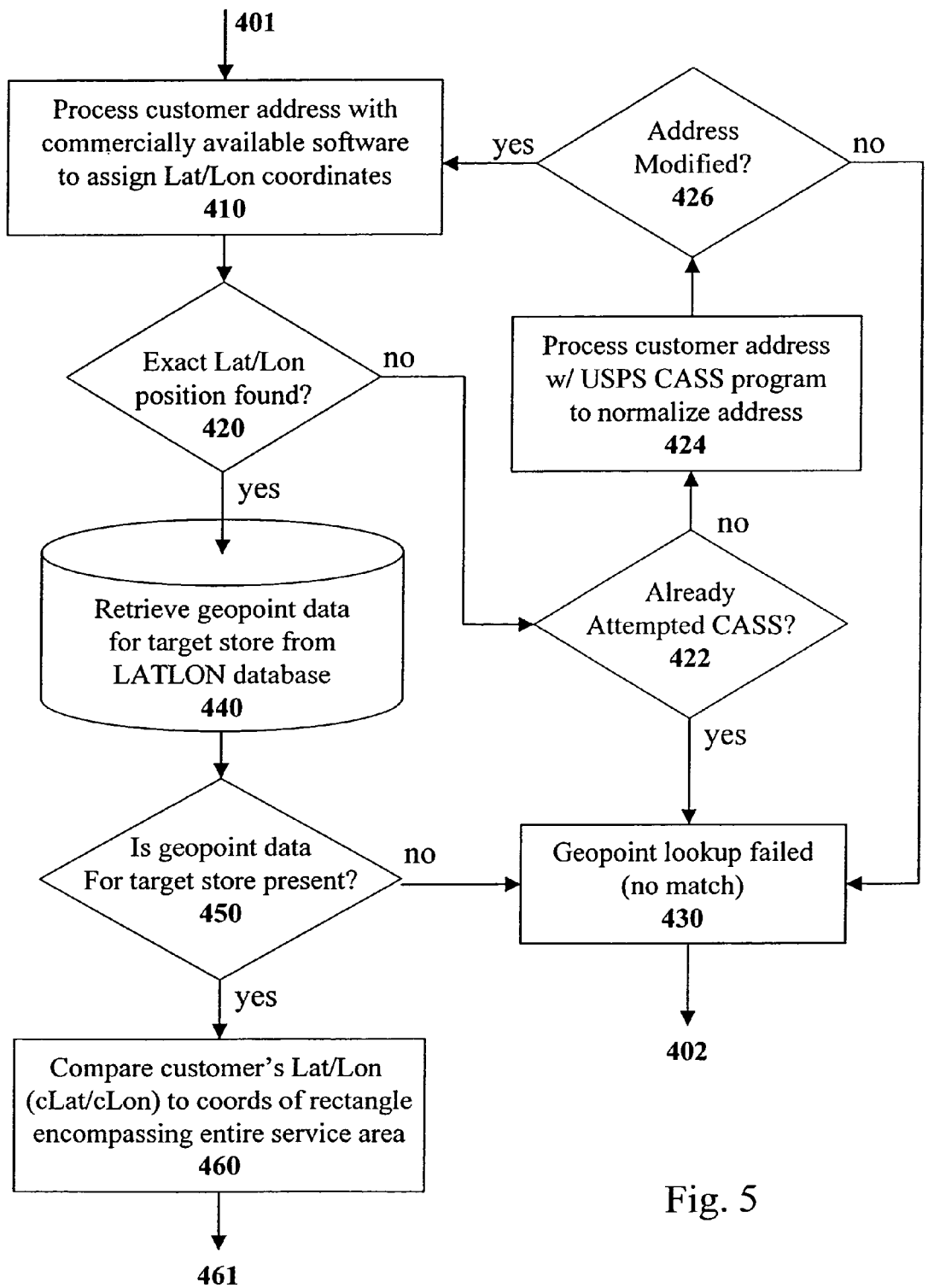
FIG. 5 is a flowchart of a geopoint lookup process for store assignment.
Figure 6:
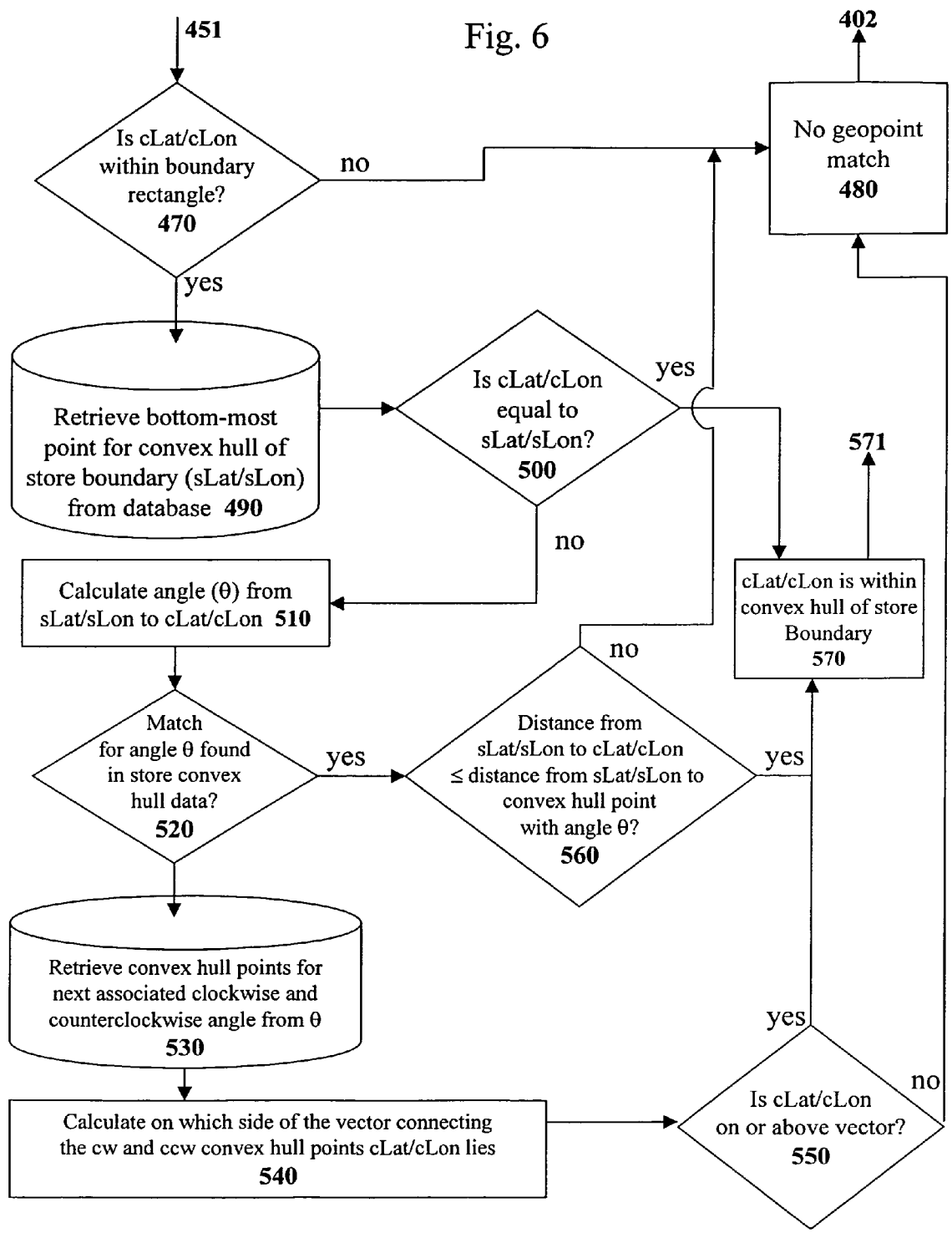
FIG. 6 is a flowchart of the geopoint lookup convex hull matching technique.
Figure 7:
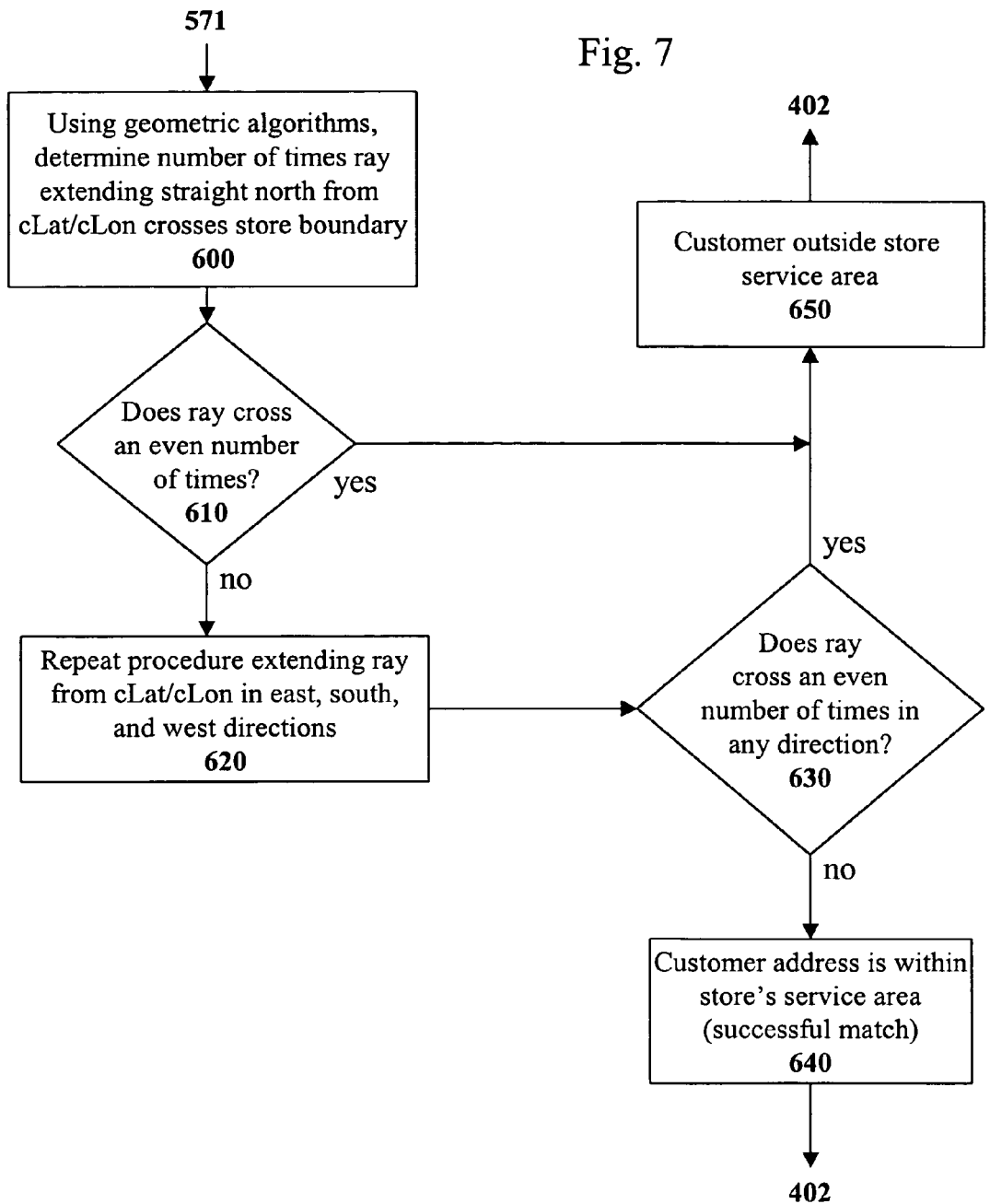
FIG. 7 is a flowchart of the geopoint lookup boundary intersection technique.
Figure 9:
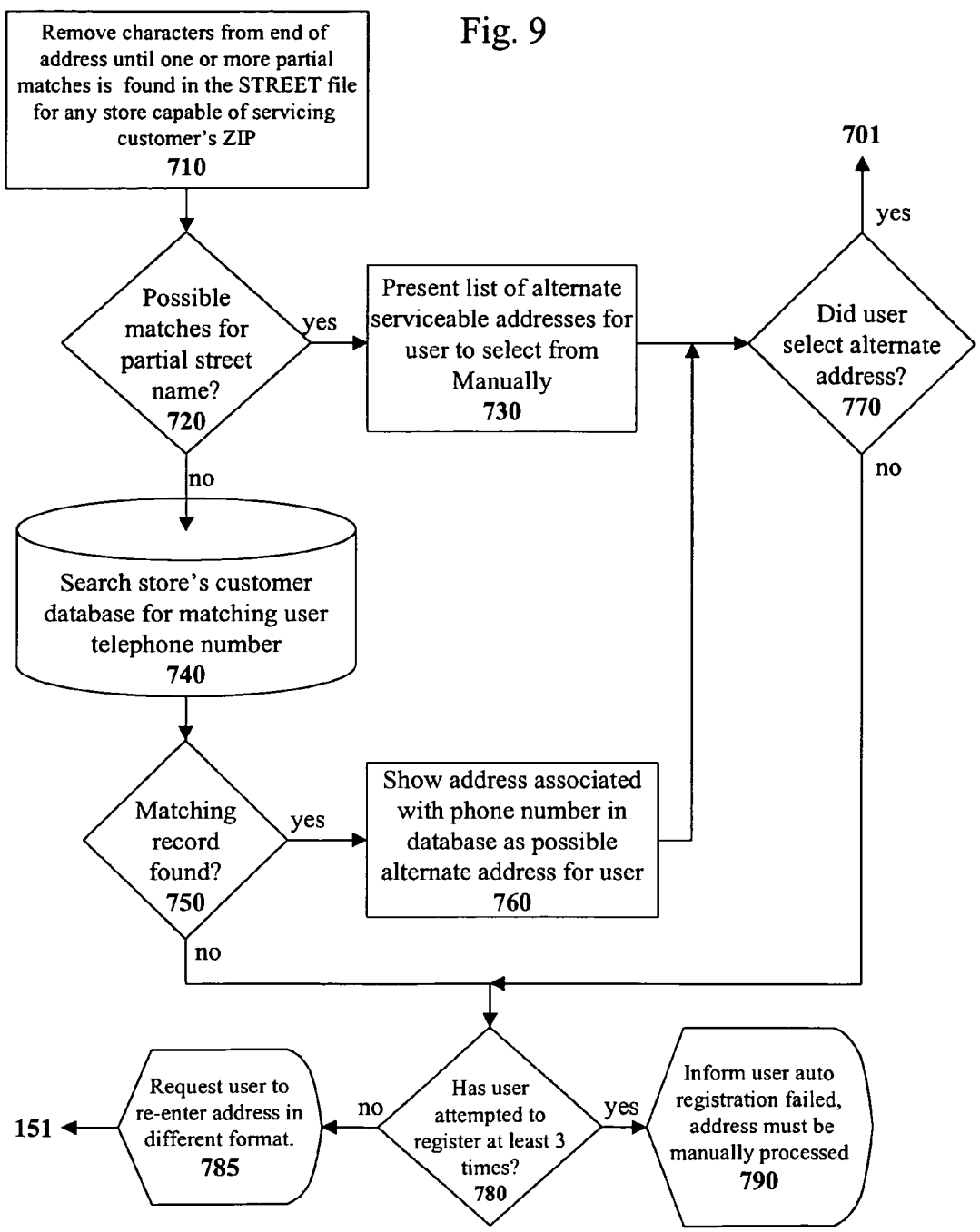
FIG. 9 is a flowchart of an alternative address lookup procedure.

If an exact match between the user's address and a store STREET file entry is still unable to be made, the system then implements a geopoint lookup procedure 400. A geopoint lookup procedure is illustrated in the flowchart of FIGS. 5–7. As illustrated in FIG. 5, the first step in the geopoint lookup procedure is to try to determine an exact geographic position (latitude/longitude) for the address the user submitted, step 410. This step can be implemented by feeding the provided delivery address information to commercially available, standardized databases and software packages such as MAPINFO. The system then determines whether latitude and longitude coordinates were located for the specified delivery address, step 420. If an exact determination of the customer's longitude and latitude ("cLat/cLon") cannot be made, the system will process the customer supplied address to normalize the address, step 424 and return again to step 410 to determine whether latitude and longitude coordinates can be located, this time for the normalized address. Specifically, step 424 comprises the step of processing the customer supplied address using a United States Postal Service certified CASS program to normalize the address. If it is determined that the process resulted in a modified address indicating that normalization was accomplished, step 426, the normalized address is again processed using commercially available software to assign a latitude and longitude coordinate, step 410. If the address was not modified, the geopointing match for that address/ store is marked as unsuccessful, step 430. Prior to performing step 424 it is determined whether a CASS normalization had previously been attempted, step 422, so as to not repeat the process in a never ending loop. If previously attempted, the geopointing match for that address/store is marked as unsuccessful, step 430.

Figure 11:
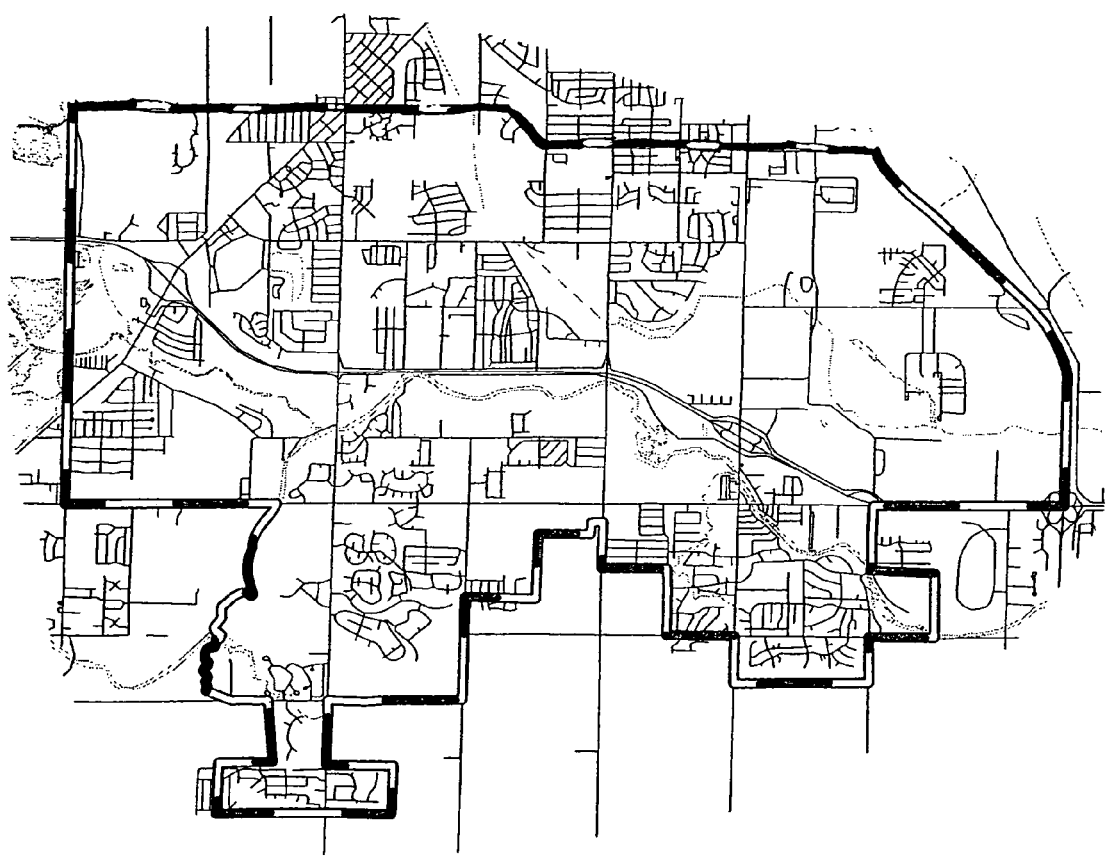
FIG. 11 is a map illustrating the detailed path defining the area services by a business.

If cLat/cLon is determined, the system attempts to retrieve previously stored geographic data describing each store's service area from a LATLON database file, step 440, and determined whether that attempted retrieval is successful, step 450. A typical LATLON database file defining the service area of a store is shown by FIGS. 8a and 8b. The data shown in FIGS. 8a and 8b is shown as an ANSI standard M data file (formerly a MUMPS file). The data shown in FIG. 8c corresponds to the type of data contained in FIGS. 8a and 8b but formatted to be more easily read. A typical map illustrating the service area of a business is shown in FIG. 11 whereby the vertices thereof describe the polygon and define the perimeter of the service area. As can be seen from FIG. 11 a very detailed and specific service area can be defined with great precision by use of a virtually unlimited number of vertices or points. Unlike the prior art, there are no portions of pre-defined grids or areas which describe a geographic area that are outside the area actually serviced by the business.

If predetermined geopoint data is not found for a particular store, the geopointing match for that address/store association is marked as unsuccessful, step 430. If geographic data is found for that store, the system then begins its determination of whether cLat/cLon lies within the polygonal service area defined by the store's LATLON database record.

In the embodiment illustrated, three successive processes are used to determine if the customer's exact location (cLat/cLon) is located within the store's service area boundaries. The first two processes cannot positively determine if cLat/cLon is located within the store's boundary, but rather provide positive indications if cLat/cLon is outside the store's service area boundary. These processes are used because they can provide a fast and efficient rejection of delivery addresses that are completely outside of a store's service area, thus providing faster system response and reducing processing overhead for addresses that are not serviced by a particular store.

The predetermined geographic data retrieved for a given store from the LATLON database includes the following datasets: a) latitude and longitude points defining a rectangle that encompasses ALL vertices of a store's polygonal delivery area boundary, b) latitude and longitude points defining the convex hull polygon that encompasses ALL vertices of a store's polygonal delivery area boundary, and c) latitude and longitude points comprising vertices of the store's actual service area boundary.

The first comparison process, step 460, compares cLat/ cLon to the latitude and longitude points defining the encompassing rectangle. In step 470 of FIG. 6, a determination is made as to whether cLat/cLon lies within the range defined by the rectangle. If cLat/cLon is not within the rectangle, then cLat/cLon cannot be within the store's service area boundary, and the store is marked as not servicing the customer delivery location, step 480.

If cLat/cLon is within the bounding rectangle, the system next retrieves the bottom-most latitude and longitude coordinate in the convex hull ("sLat/sLon"), step 490, and compares sLat/sLon to cLat/cLon, step 500. A convex hull is a geometric set of points that encompasses a set of interior points. If cLat/cLon is exactly equal to sLat/sLon, then the customer is located at a vertex of the store service area boundary, and the customer is within the convex hull of the store service area (step 570), and therefore may be within that store's service area. If cLat/cLon is not equal to sLat/ sLon, the angle θ to cLat/cLon from horizontal with sLat/ sLon determining the base (0,0) coordinate is calculated in step 510. Angle θ is calculated as follows:

Angle (θ) between cLat/cLon and sLat/sLon (in radians):

If $cLon=sLon, cLat>sLat, \theta=\pi/2$

If $cLon=sLon, cLat<sLat, \theta=\pi/2$

If $cLon>sLon, \theta=\pi-\text{ATAN}((cLon-cLat)/(sLon-sLat))$

If $cLon<sLon, \theta=-1*\text{ATAN}((cLon-cLat)/(sLon-sLat))$ (where ATAN=the arctan or inverse tangent function)

The LATLON database geographic data for the store's convex hull is then referenced to see if any convex hull vertex coordinates ("vLat/vLon") form an angle to sLat/sLon that is equal to θ, step 520. The angle value for each vertex is precalculated and stored at the time the store's LATLON convex hull database is generated, thus reducing the processing required during the geopoint lookup procedure. If an exact angle match is found, then the distance between sLat/sLon and cLat/cLon is compared to the distance between sLat/sLon and vLat/vLon, step 560. Because the distance between points (x1, y1) and (x2, y2) is calculated as $SQRT((x1-x2)^2+(y1-y2)^2)$, processing time can be further reduced by making the distance comparison between distances squared so as to avoid additional square root calculations.

In addition, the distance squared value from sLat/sLon to vLat/vLon for each vertex point in the convex hull is precalculated and stored at the time the store's convex hull database is generated. If the distance (or distance squared) from cLat/cLon to sLat/sLon is equal or less than the distance from vLat/vLon to sLat/sLon, then cLat/cLon is within the convex hull for the store boundary, step 570. If the distance (or distance squared) from cLat/cLon to sLat/sLon is not less than the distance from vLat/vLon to sLat/sLon, then cLat/cLon lies outside of the service area convex hull, and the customer is not within the store's service area, step 480.

If an exact angle match is not found in step 520, then the system next retrieves the convex hull vertices immediately clockwise ("cwLat/cwLon") and counterclockwise ("ccLat/ccLon") from cLat/cLon, step 530. The segment joining cwLat/cwLon and ccLat/ccLon defines the nearest edge boundary to the convex hull for cLat/cLon. A calculation is then performed to determine if cLat/cLon lies within the convex hull by determining on which side of the segment cLat/cLon lies, step 540. The determination is made by implementation of the following calculation:

SIDE=(cLon*(cwLat−ccLat))−(cLat*(cwLon−ccLon))+((cwLon*ccLat)−(ccLon*cwLat))

If SIDE=0 then *cLat/cLon* is collinear with *ccLat/ccLon−cwLat/cwLon* segment

<0 then *cLat/cLon* is "below" segment

>0 then *cLat/cLon* is "above" segment

If cLat/cLon is determined to be below the segment (i.e. SIDE <0), then cLat/cLon is outside of the store's service area, step 480.

If cLat/cLon is determined to be on or above the segment in step 550 (i.e. SIDE is ≧0), it is within the convex hull of the points defining the store boundary, step 570. The system then proceeds to determine if cLat/cLon is within the actual polygon that defines the store boundary via the process illustrated in FIG. 7. This is done by first extending a ray straight north (90 degrees or π/2 radians), and counting the number of times that ray crosses a segment defining the store boundary, step 600. The system then determines whether the ray crosses boundary segments an even number of times, step 610. According to a fundamental principle of geometry, if the number of segment crossings is even, the point (cLat/cLon) is not located within the polygon (store service area boundary), meaning the customer delivery address is outside of the store delivery area, step 650.

If the number of boundary segment crossings is odd for the northerly ray, the system proceeds to check rays extending in each of the other principle directions (east, south, and west, or 0, 270, and 180 degrees, or 0, −π/2, and π radians) in step 620. In step 630, the system determines if any ray crosses boundary segments an even number of times. If the number of line crossings is even for any ray, the delivery location point does not lie within the service area polygon, step 650, and the subsequent directions do not need to be checked. If, after all directions are checked, there are no even number of crossings in any direction, then the cLat/cLon lies within the store service area boundary, step 640.

Upon completion of geopoint lookup procedure 400, the system determines whether a store match was found for the customer's delivery location in step 360 of FIG. 3. If the geopoint lookup was successful, the store is added to the list of available stores, step 315.

If the geopoint lookup procedure did not match the customer's address to a store (either because the customer address could not be assigned a lat/lon value, the store's geographic information data is not available, or the cLat/cLon value did not lie within the store's boundary), the system next performs an alternative address lookup 700, illustrated in FIG. 7. Alternative address lookup 700 uses two procedures to try to determine possible alternate serviceable addresses. An alternate address is one which is known to be serviceable by the system (i.e. it has one or more stores associated with it), but cannot be automatically matched to the address the customer entered.

The first step 710 is to progressively remove the end portion of the user's address until one or more partial matches can be found in the store's STREET database. Step 720 determines whether possible matches to the partial street name were found. For example, if the user entered "MAIN ST" and no exact match was found in the STREET database, the system would then shorten the input to "MAIN". In this case there might be a "MAIN PL" and a "MAIN AVE", and these would then be possible alternate addresses. If there are one or more possible alternate addresses, the list is presented on-screen to the user for manual selection in step 730. If the user then chooses to select one of the addresses as the desired delivery address, step 770, then the store that is known to service that address is added to the list of available stores, step 315. It is also contemplated that the store street map database may include one or more vanity addresses which service to minimize the number of unnecessary notices of unavailability sent to users.

If no alternate addresses are found by partial street matching, the system then accesses a customer database that is cross-indexed by phone number in step 740. Such customer databases are commonly maintained by store POS systems known in the art. If there is an exact match of the phone number that the user entered and a phone number in the customer database in step 750, then the address associated with that phone number in the customer database is presented as a possible alternate address for the user, step 760. The system again determines whether the user has selected a possible alternative address, step 770, and reacts accordingly.

If no possible alternate addresses are located, or the user declines to choose any alternate addresses presented to them, the system next checks how many times the user has attempted to register during their current session, step 780. If the user has attempted to register less than three times, the system prompts for them to try modifying their address and resubmitting it, step 785, in hopes that they will enter in an address more compatible with the registration process and incorporated databases. However, if the user has attempted at least three times to register, the system presents them with a different message informing them that they are unable to be registered automatically and that their address information will be submitted to the QuikOrder development staff for review and/or manual assignment to a store servicing their area if one is available, step 790.

Once each potential store has been tested to determine whether the customer's exact delivery location matches its service area, the system determines whether at least one match was found in step 280. If the delivery location does not match the service area of any store in the system, the user is informed that service is not available for their area, step 240.

If at least one match is found, then one matching store is assigned to the user for any orders placed thereafter, step 290, FIG. 3. When more than one store matches, the assignment may be made in a number of ways. For example, the store assigned may be randomly selected. The system may assign the first store determined to be matching. The system may also prioritize stores that pay a service premium. The system may select the store that is physically closest to the delivery location. As another option, the user may be presented with the option to manually select their preferred store. Once a store is assigned, the user proceeds to an order entry page, step 297.

Figure 10:
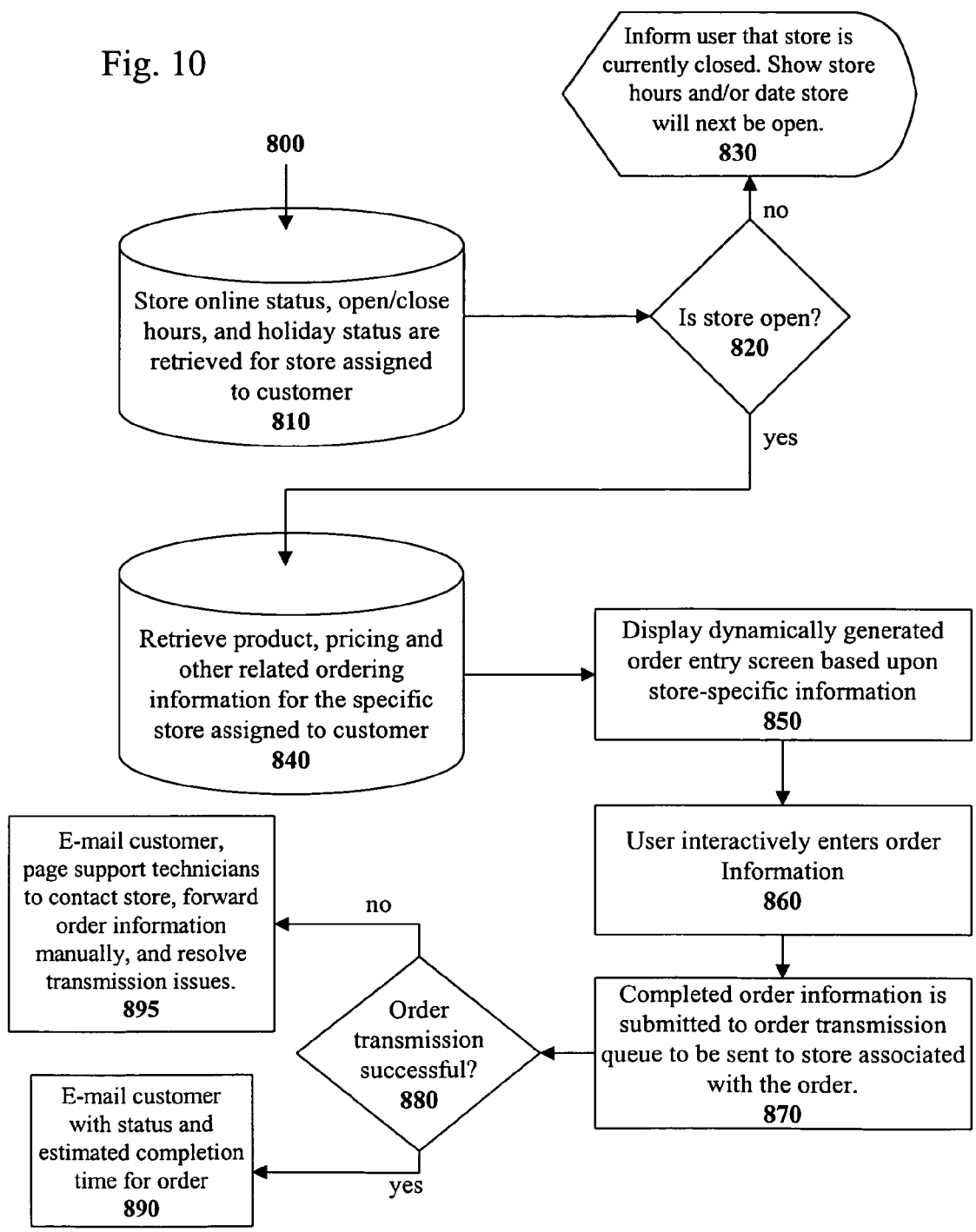
FIG. 10 is a flowchart of an order entry process.

An order entry process is illustrated by FIG. 10. In step 810, the active/inactive status of online ordering, hours of operation, and holiday status information is retrieved from the database for the customer's assigned store. Step 820 determines whether the assigned store is currently available for ordering. If the store is not available to receive an order, the customer is notified that the store is closed and provided with store operating schedule information, step 830.

If the assigned store is open, the system retrieves product menu, pricing and other related ordering information for the specific assigned store, step 840. The system then displays a dynamically generated order entry screen based upon the store-specific information, step 850. The user interactively enters the desired order information, step 860, and the completed order is submitted for electronic transmission to the assigned store in step 870. The system next determines whether transmission of the order was successful in step 880. If so, then the system sends a status email to the customer that includes the estimated delivery time from the assigned store's POS system, if such information is available. If the order is placed for takeout, the message includes the estimated time at which the order will be ready for pickup. If order transmission fails, the system responds accordingly in step 895. For example, the system may send an email to the customer, explaining that the order has failed and that the assigned store should by called directly for telephone placement of the order. Additionally, the system may page support technicians. The support technicians may contact the store, forward the order information manually, and/or attempt to help the store resolve its order reception problems.

The foregoing description and drawings merely explain and illustrate the invention and the invention is not limited thereto except insofar as the appended claims are so limited, inasmuch as those skilled in the art, having the present disclosure before them will be able to make modifications and variations therein without departing from the scope of the invention.

We claim:

1. A method for determining whether a business is capable of fulfilling an Internet user's order for a service to be provided to at the Internet user's specified delivery location, the method comprising the steps of:

associating with the business a plurality of coordinate points defining a polygonal geographic service area within which the business provides the service;

determining the latitude and longitude coordinate of the delivery location;

determining whether the coordinate position of the delivery street address lies within the polygonal service area; and determining that the business is capable of filling the Internet order if the delivery street address lies within the polygonal service area, wherein the Internet order comprises an order for a product to be physically delivered to the Internet user's delivery location;

failing to determine the latitude and longitude position of the delivery street address;

receiving from the user a telephone number associated with the delivery address;

searching a business customer database for records with associated telephone numbers matching the number received from the user;

presenting to the user an address from a record that also contains an associated telephone number matching the number received from the user;

selecting by the user the presented address; and determining that the business is capable of fulfilling the user's Internet order for provision of the service to the selected address.

2. A method by which a customer can place an order for delivery of food to a delivery address with one of a plurality of vendors via the Internet, the method comprising the steps of:

associating with each vendor a series of latitude and longitude coordinate points, which points define a plurality of vertices of a delivery polygon circumscribing a geographic area in which the vendor provides its delivery service; transmitting the customer's specified delivery address to a central server;

translating the customer's specified delivery address into a delivery point comprised of a latitude and longitude coordinate, the delivery point specifying a geographic position to which the food is to be delivered; and compiling a list of available vendors whose associated delivery polygons circumscribe the customer's delivery point;

wherein in which the step of compiling a list of vendors whose associated delivery polygons circumscribe the customer's delivery point is comprised of the substeps of:

eliminating from the list each vendor for whom the delivery point does not lie on or within a rectangle circumscribing the vertices of its delivery polygon;

eliminating from the list each vendor for whom the delivery point does not lie on or within the convex hull of the vertices of its delivery polygon; and eliminating from the list each vendor for whom a ray extending from the delivery point crosses an even number of delivery polygon boundary segments.

3. A method by which a customer can place an order for delivery of food to a delivery address with one of a plurality of vendors via the Internet, the method comprising the steps of:

associating with each vendor a series of latitude and longitude coordinate points, which points define a plurality of vertices of a delivery polygon circumscribing a geographic area in which the vendor provides its delivery service; transmitting the customer's specified delivery address to a central server;

translating the customer's specified delivery address into a delivery point comprised of a latitude and longitude coordinate, the delivery point specifying a geographic position to which the food is to be delivered; and compiling a list of available vendors whose associated delivery polygons circumscribe the customer's delivery point;

the method further including the subsequent step of selecting one vendor from the list of available vendors;

wherein the step of selecting one vendor is comprised of the substeps of:

determining the position of each available vendor, which vendor position is the latitude and longitude coordinate point at which each vendor operates its business;

calculating for each available vendor the delivery distance between the vendor position and the delivery point;

selecting the vendor associated with the smallest delivery distance.

4. A method by which a customer using a computer can place an order for a service to be provided, the order being placed with one of one or more vendors that utilize electronic ordering terminals to process service orders by transmitting information between the customer's computer and a server, the method comprising the steps of:

associating with each vendor a plurality of coordinate points, the plurality of coordinate points defining a plurality of vertices of a polygonal geographic region, where the vendor provides the service to all points within its associated polygonal region, and the vendor does not provide the service to any points outside its associated polygonal region;

receiving information from a customer indicative of the location at which the service is to be provided;

converting the received information into a customer coordinate point indicative of the point to which the service is to be provided;

selecting each of the defined polygonal geographic regions that encompass the customer coordinate point;

identifying the one or more vendors associated with the selected polygonal geographic regions;

choosing one of the identified vendors with which the customer's order is to be placed; and placing an order by the customer with the chosen vendor; wherein the coordinate points are latitude and longitude pairs defining points within the global latitude and longitude coordinate system; and the step of selecting the polygonal geographic regions is comprised of the substeps of:

determining the number of times a ray extending out from the customer coordinate point crosses a boundary segment of each polygonal region;

failing to select the polygonal regions for which the ray crosses boundary segments an even number of times.

5. The method of claim 4, in which the step of selecting the polygonal geographic regions further includes the preceding substeps of:

calculating a convex hull associated with the vertices of each polygonal geographic region;

determining whether the customer coordinate point ties on or within the convex hull;

eliminating from selection consideration the polygonal geographic regions for which the customer coordinate point does not lie on or within the associated convex hull.

6. The method of claim 5, in which the step of selecting the polygonal geographic regions further includes the preceding substeps of:

identifying a rectangle associated with each polygonal geographic region that encompasses the region's vertices;

determining whether the customer coordinate point lies on or within the rectangle;

eliminating from selection consideration the polygonal geographic regions for which the customer coordinate point does not lie on or within the associated rectangle.

7. The method of claim 4, in which the step of selecting the polygonal geographic regions further includes the preceding substeps of:

identifying a rectangle associated with each polygonal geographic region that encompasses the region's vertices;

determining whether the customer coordinate point lies on or within the rectangle;

eliminating from selection consideration the polygonal geographic regions for which the customer coordinate point does not lie on or within the associated rectangle.

8. A method for determining whether a business is capable of fulfilling an Internet user's order for a service to be provided to at the Internet user's specified delivery location, the method comprising the steps of:

associating with the business a plurality of coordinate points defining a polygonal geographic service area within which the business provides the service;

determining the latitude and longitude coordinate of the delivery location;

determining whether the coordinate position of the delivery street address lies within the polygonal service area; and determining that the business is capable of filling the Internet order if the delivery street address lies within the polygonal service area, wherein the Internet order comprises an order for a product to be physically delivered to the Internet user's delivery location;

wherein the step of determining whether the coordinate position of the delivery street address lies within the polygonal service area comprises the substep of:

considering the delivery street address to lie outside of the service area if a ray extending from the coordinate position of the delivery street address intersects the polygon boundary an even number of times.

9. The method of claim 8, in which the step of determining whether the coordinate position of the delivery street address lies within the polygonal service area further comprises the preceding substep of:

considering the delivery street address to lie outside of the service area if the coordinate position lies outside of the convex hull of the polygon vertices.

10. The method of claim 9, in which the step of determining whether the coordinate position of the delivery street address lies within the polygonal service area further comprises the preceding substep of:

considering the delivery street address to lie outside of the service area if the coordinate position lies outside of a rectangle that fully encompasses the polygon vertices.

11. The method of claim 8, in which the step of determining whether the coordinate position of the delivery street address lies within the polygonal service area further comprises the preceding substep of:

considering the delivery street address to lie outside of the service area if the coordinate position lies outside of a rectangle that fully encompasses the polygon vertices.

12. A method for determining whether a business is capable of fulfilling an Internet user's order for a service to be provided to the Internet user's specified delivery location, the method comprising the steps of:

associating a street map file with the business, which file includes street names and addresses to which the business provides the service;

receiving from the user a delivery street address associated with the delivery location;

searching for the delivery street address in the street map file;

determining that the delivery location is serviced by the business if the delivery street address is located within the street map file;

wherein the street map file contains street names, and corresponding address ranges over which service is provided to that street, the step of searching for the delivery street address in the street map file comprising the substeps of:

parsing the delivery street address into a delivery street name and a delivery street number;

locating an entry within the street map file, which entry's street name matches the delivery street name;

determining that the delivery street address is located within the street map file if the address range corresponding to the entry encompasses the delivery street number.

13. The method of claim 12, the method further comprising the steps of:

failing to locate the delivery street address within the street map file;

failing to determine the latitude and longitude position of the delivery street address; receiving from the user a telephone number associated with the delivery address; searching a business customer database for records with associated telephone numbers matching the number received from the user;

presenting to the user an address from a record that also contains an associated telephone number matching the number received from the user;

selecting by the user the presented address;

determining that the business is capable of fulfilling the user's Internet order for provision of the service to the selected address.

14. The method of claim 12, the method further comprising the steps of:

failing to locate the delivery street address within the street map file;

determining the latitude and longitude coordinate position of the delivery street address;

associating with the business a set of coordinate points defining a polygonal geographic service area within which the business provides the service;

determining whether the coordinate position of the delivery street address lies within the polygonal service area;

determining that the business is capable of filling the Internet order if the delivery street address lies within the polygonal service area.

15. The method of claim 14, in which the step of determining whether the coordinate position of the delivery street address lies within the polygonal service area comprises the substep of:

considering the delivery street address to lie outside of the service area if a ray extending from the coordinate position of the delivery street address intersects the polygon boundary an even number of times.

16. A method by which a customer using a computer can place an order for a service to be provided, the order being placed with one of one or more vendors that utilize electronic ordering terminals to process service orders by transmitting information between the customer's computer and a server, the method comprising the steps of:

associating with each vendor a plurality of coordinate points, the plurality of coordinate points defining a plurality of vertices of a polygonal geographic region, where the vendor provides the service to all points within its associated polygonal region, and the vendor does not provide the service to any points outside its associated polygonal region;

receiving information from a customer indicative of the location at which the service is to be provided;

converting the received information into a customer coordinate point indicative of the point to which the service is to be provided;

selecting each of the defined polygonal geographic regions that encompass the customer coordinate point;

identifying the one or more vendors associated with the selected polygonal geographic regions;

choosing one of the identified vendors with which the customer's order is to be placed; and placing an order by the customer with the chosen vendor;

wherein the step of placing an order by the customer with the chosen vendor includes the substeps of:

transmitting information detailing goods or services provided by the chosen vendor from the server to the customer's computer;

compiling an order comprising one or more goods and/or services;

transmitting the order information from the customer's computer to the server over an electronic data network;

placing the order directly into the vendor's electronic order terminal by the server or stand alone printer or fax machine or other information transmission device;

wherein the method further includes the subsequent steps of:

sending a first order receipt confirmation from the vendor's electronic order terminal to the server; and sending a second order confirmation from the server to the customer's computer;

and wherein the first and second order receipt confirmations both include an estimated time at which the ordered service will be provided, which estimated time is generated by the electronic order terminal.

17. The method of claim 12, the method further comprising the steps of:

failing to locate the delivery street address within the street map file;

failing to determine the latitude and longitude position of the delivery street address;

removing characters from the end of the delivery address and searching for matches to the truncated address in the business street map file until one or more partial matches is found;

presenting a list of the partial matches to the user;

selecting by the user one of the partially matched addresses to which service is to be provided;

determining that the business is capable of fulfilling the user's Internet order for provision of the service to the selected address.

18. A method by which a customer using a computer can place an order for a service to be provided, the order being placed with one of one or more vendors that utilize electronic ordering terminals to process service orders by transmitting information between the customer's computer and a server, the method comprising the steps of:

associating with each vendor a plurality of coordinate points, the plurality of coordinate points defining a plurality of vertices of a polygonal geographic region, where the vendor provides the service to all points within its associated polygonal region, and the vendor does not provide the service to any points outside its associated polygonal region;

receiving information from a customer indicative of the location at which the service is to be provided;

converting the received information into a customer coordinate point indicative of the point to which the service is to be provided;

selecting each of the defined polygonal geographic regions that encompass the customer coordinate point;

identifying the one or more vendors associated with the selected polygonal geographic regions;

choosing one of the identified vendors with which the customer's order is to be placed; and placing an order by the customer with the chosen vendor;

wherein the step of placing an order by the customer with the chosen vendor includes the substeps of:

transmitting information detailing goods or services provided by the chosen vendor from the server to the customer's computer;

compiling an order comprising one or more goods and/or services;

transmitting the order information from the customer's computer to the server over an electronic data network;

placing the order directly into the vendor's electronic order terminal by the server or stand alone printer or fax machine or other information transmission device;

wherein the method further includes the subsequent steps of:

sending a first order receipt confirmation from the vendor's electronic order terminal to the server; and deactivating a store such that no further orders are placed thereto upon failure to satisfy a predetermined order performance criterion;

wherein the predetermined order performance criterion is a maximum number of consecutive orders for which positive order receipt confirmations are not received by the server.

19. A method by which a customer using a computer can place an order for a service to be provided, the order being placed with one of one or more vendors that utilize electronic ordering terminals to process service orders by transmitting information between the customer's computer and a server, the method comprising the steps of:

associating with each vendor a plurality of coordinate points, the plurality of coordinate points defining a plurality of vertices of a polygonal geographic region, where the vendor provides the service to all points within its associated polygonal region, and the vendor does not provide the service to any points outside its associated polygonal region;

receiving information from a customer indicative of the location at which the service is to be provided;

converting the received information into a customer coordinate point indicative of the point to which the service is to be provided;

selecting each of the defined polygonal geographic regions that encompass the customer coordinate point;

identifying the one or more vendors associated with the selected polygonal geographic regions;

choosing one of the identified vendors with which the customer's order is to be placed; and placing an order by the customer with the chosen vendor;

wherein the step of placing an order by the customer with the chosen vendor includes the substeps of:

transmitting information detailing goods or services provided by the chosen vendor from the server to the customer's computer;

compiling an order comprising one or more goods and/or services;

transmitting the order information from the customer's computer to the server over an electronic data network;

placing the order directly into the vendor's electronic order terminal by the server or stand alone printer or fax machine or other information transmission device;

wherein the method further includes the subsequent steps of:

sending a first order receipt confirmation from the vendor's electronic order terminal to the server; and deactivating a store such that no further orders are placed thereto upon failure to satisfy a predetermined order performance criterion;

wherein the predetermined order performance criterion is a maximum percentage of orders for which positive order receipt confirmations are not received by the server.

20. A method by which a customer using a computer can place an order for a service to be provided, the order being placed with one of one or more vendors that utilize electronic ordering terminals to process service orders by transmitting information between the customer's computer and a server, the method comprising the steps of:

associating with each vendor a plurality of coordinate points, the plurality of coordinate points defining a plurality of vertices of a polygonal geographic region, where the vendor provides the service to all points within its associated polygonal region, and the vendor does not provide the service to any points outside its associated polygonal region;

receiving information from a customer indicative of the location at which the service is to be provided;

converting the received information into a customer coordinate point indicative of the point to which the service is to be provided;

selecting each of the defined polygonal geographic regions that encompass the customer coordinate point;

identifying the one or more vendors associated with the selected polygonal geographic regions;

choosing one of the identified vendors with which the customer's order is to be placed; and placing an order by the customer with the chosen vendor;

wherein the step of placing an order by the customer with the chosen vendor includes the substeps of:

transmitting information detailing goods or services provided by the chosen vendor from the server to the customer's computer;

compiling an order comprising one or more goods and/or services;

transmitting the order information from the customer's computer to the server over an electronic data network;

placing the order directly into the vendor's electronic order terminal by the server or stand alone printer or fax machine or other information transmission device;

wherein the method further includes the subsequent steps of:

sending a first order receipt confirmation from the vendor's electronic order terminal to the server; and deactivating a store such that no further orders are placed thereto upon failure to satisfy a predetermined order performance criterion;
wherein the predetermined order performance criterion is a maximum time period during which a positive order receipt confirmations must be received by the server.

21. The method of claim 15, in which the step of determining whether the coordinate position of the delivery street address lies within the polygonal service area further comprises the preceding substep of:
considering the delivery street address to lie outside of the service area if the coordinate position lies outside of the convex hull of the polygon vertices.

22. The method of claim 21, in which the step of determining whether the coordinate position of the delivery street address lies within the polygonal service area further comprises the preceding substep of:
considering the delivery street address to lie outside of the service area if the coordinate position lies outside of a rectangle that fully encompasses the polygon vertices.

23. The method of claim 15, in which the step of determining whether the coordinate position of the delivery street address lies within the polygonal service area further comprises the preceding substep of:
considering the delivery street address to lie outside of the service area if the coordinate position lies outside of a rectangle that fully encompasses the polygon vertices.

* * * * *

(12) EX PARTE REEXAMINATION CERTIFICATE (6552nd)
United States Patent
Asher et al.

(10) Number: US 7,287,002 C1
(45) Certificate Issued: Dec. 2, 2008

(54) SYSTEM FOR PLACING PRODUCT DELIVERY ORDERS THROUGH THE INTERNET

(75) Inventors: Marc Asher, Highland Park, IL (US); David Brown, Orange, TX (US)

(73) Assignee: IPDEV Co., Chicago, IL (US)

Reexamination Request:
No. 90/010,048, Nov. 19, 2007

Reexamination Certificate for:
Patent No.: 7,287,002
Issued: Oct. 23, 2007
Appl. No.: 09/507,578
Filed: Feb. 18, 2000

(51) Int. Cl.
*G06Q 30/00* (2006.01)

(52) U.S. Cl. .................................. 705/26; 705/27
(58) Field of Classification Search ............... None
See application file for complete search history.

(56) References Cited

U.S. PATENT DOCUMENTS 4,797,818 A   1/1989   Cotter
5,991,739 A * 11/1999   Cupps et al. ............... 705/26

\* cited by examiner

*Primary Examiner*—Peter C. English

(57) ABSTRACT

A method is disclosed by which a customer places an order for the provision of a service with one of one or more vendors that utilize electronic ordering terminals to process service orders, by transmitting information between the customer's computer and a server. The disclosed method comprising the steps of associating with each vendor a plurality of coordinate points defining the vertices of a polygonal geographic region within which region the vendor provides service, receiving information from a customer indicating the location to which service is to be provided; converting the received information into a coordinate point indicating the point to which service is to be provided; selecting each of the defined polygonal geographic regions that encompass the customer coordinate point; identifying the vendors associated with the selected polygonal geographic regions; choosing the vendor with which the order is to be placed, and placing an order with the chosen vendor.

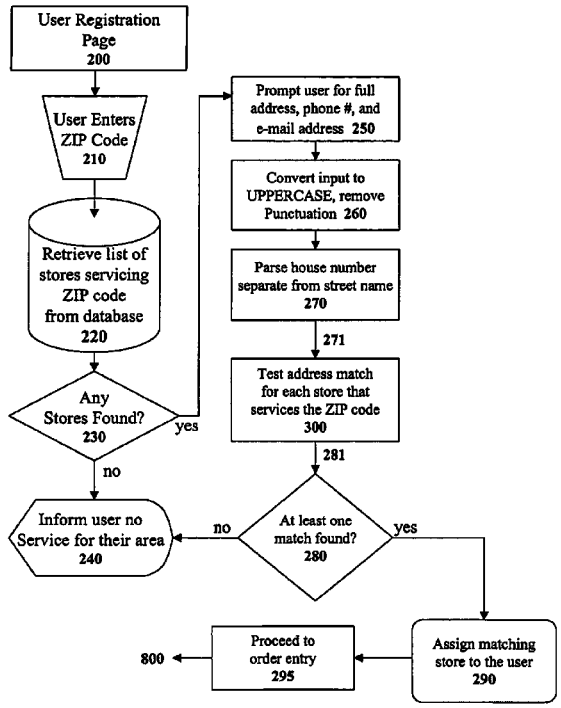

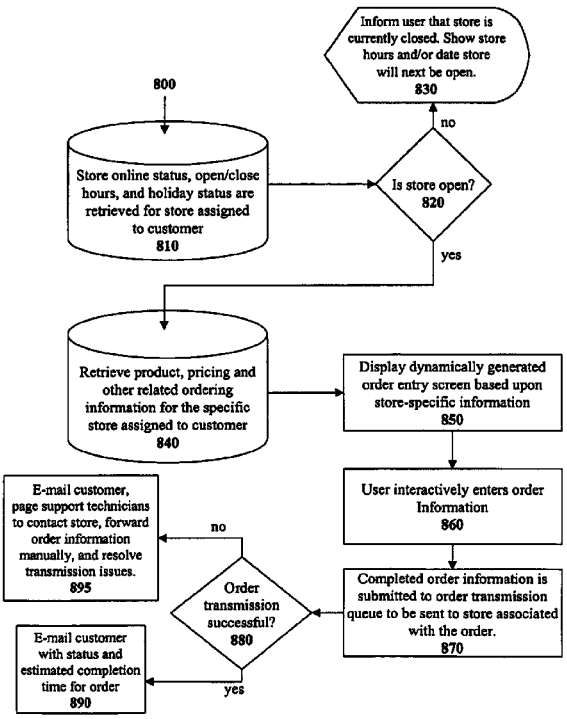

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 14 is cancelled.

Claims 12 and 15 are determined to be patentable as amended.

Claim 13, dependent on an amended claim, is determined to be patentable.

Claims 1–11 and 16–23 were not reexamined.

12. A method for determining whether a business is capable of fulfilling an Internet user's order for a service to be provided to the Internet user's specified delivery location, the method comprising the steps of:

associating a street map file with the business, which file includes street names and addresses to which the business provides the service;

receiving from the user a delivery street address associated with the delivery location;

searching for the delivery street address in the street map file;

determining that the delivery location is serviced by the business if the delivery street address is located within the street map file;

wherein the street map file contains street names, and corresponding address ranges over which service is provided to that street, the step of searching for the delivery street address in the street map file comprising the substeps of:

parsing the delivery street address into a delivery street name and a delivery street number;

locating an entry within the street map file, which entry's street name matches the delivery street name;

determining that the delivery street address is located within the street map file if the address range corresponding to the entry encompasses the delivery street number; *and*

*the method further comprising the steps of:*

*failing to locate the delivery street address within the street map file;*

*determining the latitude and longitude coordinate position of the delivery street address;*

*associating with the business a set of coordinate points defining a polygonal geographic service area within which the business provides the service;*

*determining whether the coordinate position of the delivery street address lies within the polygonal service area;*

*determining that the business is capable of filling the Internet order if the delivery street address lies within the polygonal service area.*

15. The method of claim [14] *12*, in which the step of determining whether the coordinate position of the delivery street address lies within the polygonal service area comprises the substep of:

considering the delivery street address to lie outside of the service area if a ray extending from the coordinate position of the delivery street address intersects the polygon boundary an even number of times.

\* \* \* \* \*